(12) United States Patent
Li et al.

(10) Patent No.: US 12,380,576 B2
(45) Date of Patent: Aug. 5, 2025

(54) FRAME-BASED VIDEO SEGMENTATION

(71) Applicant: QUALCOMM Incorporated, San Diego, CA (US)

(72) Inventors: Xin Li, San Diego, CA (US); Jiancheng Lyu, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/049,473

(22) Filed: Oct. 25, 2022

(65) Prior Publication Data

US 2024/0135549 A1 Apr. 25, 2024
US 2024/0233140 A9 Jul. 11, 2024

(51) Int. Cl.
*G06T 7/215* (2017.01)
*G06T 7/11* (2017.01)
*G06T 7/246* (2017.01)

(52) U.S. Cl.
CPC ............... *G06T 7/215* (2017.01); *G06T 7/11* (2017.01); *G06T 7/248* (2017.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2018/0374233 A1* | 12/2018 | Zhou | G06F 18/22 |
| 2019/0114804 A1* | 4/2019 | Sundaresan | G06T 7/74 |
| 2023/0186492 A1* | 6/2023 | Yu | G06T 7/246 |
| | | | 382/100 |

OTHER PUBLICATIONS

Huang X., et al., "Fast Video Object Segmentation With Temporal Aggregation Network and Dynamic Template Matching", 2020 IEEE/CVF Conference on Computer Vision and Pattern Recognition (CVPR), IEEE, Jun. 13, 2020, pp. 8876-8886, XP033805045, abstract p. 3-p. 5, figures 2-4.
International Search Report and Written Opinion—PCT/US2023/073969—ISA/EPO—Dec. 21, 2023.

(Continued)

*Primary Examiner* — Vikkram Bali
(74) *Attorney, Agent, or Firm* — Qualcomm/Norton Rose Fulbright US LLP

(57) ABSTRACT

Methods and systems of frame based image segmentation are provided. For example, a method for feature object tracking between frames of video data is provided. The method comprises receiving a first frame of video data, extracting a mask feature for each of one or more objects of the first frame, adjusting the first frame by applying each initial mask and corresponding identification to a respective object of the first frame, and outputting the adjusted first frame. The method further comprises tracking the one or more objects in one or more consecutive frames. The tracking comprises extracting a masked feature for each of one or more objects in the consecutive frame, adjusting the consecutive frame by applying each initial mask and corresponding identification for the consecutive frame to the respective object of the one or more objects of the consecutive frame, and outputting the adjusted consecutive frame.

29 Claims, 10 Drawing Sheets

(56) References Cited

OTHER PUBLICATIONS

Liang Y., et al., "Video Object Segmentation with Adaptive Feature Bank and Uncertain-Region Refinement", arXiv:2010.07958v1 [cs.CV], Cornell University Library, 201 Olin Library Cornell University Ithaca, NY 14853, Oct. 15, 2020, pp. 1-12, XP081787936, abstract p. 2-p. 4, figure 1.

Liu Y., et al., "Learning Quality-aware Dynamic Memory for Video Object Segmentation", arXiv:2207.07922v1 [cs.CV], Cornell University Library, 201 Olin Library Cornell University Ithaca, NY 14853, Jul. 16, 2022, 19 Pages, XP091272912, abstract p. 4-p. 6, figure 2.

* cited by examiner

FRAME-BASED VIDEO SEGMENTATION

TECHNICAL FIELD

The disclosure relates to frame-based video instance segmentation. In particular, the disclosure relates to methods and systems for frame-based video instance segmentation, including segmentation of objects (or object instances, as used interchangeably herein) of a video and tracking the objects between frames.

BACKGROUND

In recent years, object segmentation from images and videos has attracted more and more attention from academia and industry. Considering the popularity of video applications and the need for precise and personalized processing of objects within videos, video instance segmentation (VIS) is gradually becoming a key research topic.

Differing from image segmentation (segment only), the goal of video instance segmentation is to simultaneously segment and track object instances in videos. Specifically, given an input video, a VIS model needs to segment objects (pixel-wise classification for multiple things, e.g., person, pet, etc.) from every single video frame and associate segmented objects among frames (instance level tracking function). Thus, VIS is more complex and challenging than most other computer vision tasks.

SUMMARY OF DISCLOSURE

The following presents aspects to improve upon the existing techniques and systems for video instance segmentation. The techniques of the disclosure at least improve segmentation of objects of a video and tracking the objects between frames to allow the consistent application of masks (generated from the object segmentation) to the objects from frame to frame. This provides for improved precision for personalized processing of objects within videos.

According to a first aspect embodiments provide a method for object tracking between frames of video data. The method comprises receiving a first frame of video data. The first frame comprises one or more objects. A masked feature is extracted for each of one or more objects of the first frame by combining an initial mask for each object with one or more extracted features of the object. A representation of each masked feature is generated, the representation being indicative of the one or more extracted features of the masked feature. Each representation and an associated identification is stored in a feature bank. The first frame is adjusted by applying each initial mask and the corresponding identification to the respective object of the one or more objects of the first frame, and the adjusted first frame is output. The method further comprises tracking the one or more objects in one or more consecutive frames. The tracking comprises, for each consecutive frame, extracting a masked feature for each of one or more objects in the consecutive frame by combining an initial mask for each object with one or more extracted features of the object. The tracking further comprises generating a representation of each masked feature for the consecutive frame, the representation being indicative of the one or more extracted features of the masked feature. Further, it is determined whether the representation of each masked feature for the consecutive frame corresponds to a representation stored in the feature bank. In response to determining that the representation of a masked feature for the consecutive frame corresponds to a representation stored in the feature bank, the respective initial mask for the consecutive frame is associated with the identification of the corresponding stored representation, and in the feature bank the corresponding stored representation is updated with the corresponding representation of the masked feature for the consecutive frame. The tracking further comprises adjusting the consecutive frame by applying each initial mask and the corresponding identification for the consecutive frame to the respective object of the one or more objects of the consecutive frame, and outputting the adjusted consecutive frame.

The one or more objects of the frame may comprise a plurality of objects.

The method may further comprise, in response to determining that the representation of a masked feature for the consecutive frame does not corresponds to a representation stored in the feature bank, storing the representation of the masked feature for the consecutive frame as a new entry in the feature bank.

Determining whether the representation of a masked feature for the consecutive frame corresponds to a representation stored in the feature bank may comprise: comparing the representation of the masked feature for the consecutive frame with each stored representation; determining a similarity metric for each stored representation, the similarity metric indicative of the similarity between the representation of the masked feature for the consecutive frame and the stored representation; and determining, based on the similarity metrics, whether the representation of the masked feature for the consecutive frame corresponds to a representation stored in the feature bank.

Extracting a masked feature for each of one or more objects in the consecutive frame may comprise extracting a masked feature for each of a plurality of objects in the consecutive frame.

The representation of a masked feature may be a vector.

Determining whether a representation of a masked feature for the consecutive frame corresponds to a representation stored in the feature bank may comprise computing a cosine similarity between the representation of the masked feature for the consecutive frame and the stored representation.

Correspondence between the representation of a masked feature for the consecutive frame and a representation stored in the feature bank may indicate a similarity between the features of the masked feature for the consecutive frame and features of the masked feature of the representation stored in the feature bank.

The features of a masked feature may comprise one or more of color of the object, edges of the object or corners of the object.

Extracting a masked feature for each of one or more objects of the first frame may comprise inputting the first frame into a convolutional neural network to extract semantic data indicative of one or more features of each of the one or more objects; segmenting the first frame to generate the initial mask for each of the one or more objects; combine the initial mask with the semantic data to generate the masked feature for each of the one or more objects. The one or more features of the masked feature may comprise the semantic data indicative of one or more features of the respective object. The one or more features of the respective object may comprise one or more of color of the object, edges of the object or corners of the object. Each masked feature may comprise one or more extracted features. These extracted features may be considered low-level semantic features herein. Intermediate-level semantic features may also be used. For example, if the use case involves persons as the instance objects, intermediate-level semantic features may include hands, arms and heads. Both low and intermediate level features may be used to distinguish between objects within the same category (e.g. distinguishing between two different persons, or two different vehicles, etc.). In certain use cases, high-level semantic features may also be used, such as categories like persons, vehicles, pets, buildings—such features may be appropriate for use cases that require distinction between categories (e.g. between person and car), rather than distinction within a category (e.g. distinguishing between different persons). Extracting semantic data indicative of one or more features of each of the one or more objects may comprise applying one or more functions to the data of the first frame, the one or more functions comprising a convolution function, an activation function, a batch normalization function and a dropout function. Segmenting the first frame to generate an initial mask for each of the one or more objects may comprise performing a pixel-by-pixel comparison for the pixels of the first frame, the pixel-by-pixel comparison identifying groups of similar pixels, each group representing an object of the one or more objects of the frame. According to certain embodiments the segmentation comprises reducing the resolution of the first frame to produce a reduced frame (a frame of reduced size) and performing the pixel-by-pixel comparison for the pixels of the reduced frame. This may be achieved by arranging the reduced resolution frame along a single dimension and then performing the pixel-by-pixel comparison According to the aspect embodiments also provide a system for object tracking between frames of video data comprising one or more processors configured to: receive a first frame of video data, the first frame comprising one or more objects; extract a masked feature for each of one or more objects of the first frame by combining an initial mask for each object with one or more extracted features of the object; generate a representation of each masked feature, the representation being indicative of the one or more extracted features of the masked feature, and storing each representation in a feature bank; adjust the first frame by applying each initial mask and the corresponding identification to the respective object of the one or more objects of the first frame, and outputting the adjusted first frame; and track the one or more objects in one or more consecutive frames, the tracking comprising, for each consecutive frame: extracting a masked feature for each of one or more objects in the consecutive frame by combining an initial mask for each object with one or more extracted features of the object; generating a representation of each masked feature for the consecutive frame, the representation being indicative of the one or more extracted features of the masked feature; determining whether the representation of each masked feature for the consecutive frame corresponds to a representation stored in the feature bank; in response to determining that the representation of a masked feature for the consecutive frame corresponds to a representation stored in the feature bank, associating the respective initial mask for the consecutive frame with the identification of the corresponding stored representation, and updating in the feature bank the corresponding stored representation with the corresponding representation of the masked feature for the consecutive frame; adjusting the consecutive frame by applying each initial mask and the corresponding identification for the consecutive frame to the respective object of the one or more objects of the consecutive frame, and outputting the adjusted consecutive frame.

The one or more objects of the frame may comprise a plurality of objects.

The one or more processors of the system may be further configured to, in response to determining that the representation of a masked feature for the consecutive frame does not corresponds to a representation stored in the feature bank, store the representation of the masked feature for the consecutive frame as a new entry in the feature bank.

Determining whether the representation of a masked feature for the consecutive frame corresponds to a representation stored in the feature bank may comprise: comparing the representation of the masked feature for the consecutive frame with each stored representation; determining a similarity metric for each stored representation, the similarity metric indicative of the similarity between the representation of the masked feature for the consecutive frame and the stored representation; and determining, based on the similarity metrics, whether the representation of the masked feature for the consecutive frame corresponds to a representation stored in the feature bank.

Extracting a masked feature for each of one or more objects in the consecutive frame may comprise extracting a masked feature for each of a plurality of objects in the consecutive frame.

The representation of a masked feature may be a vector.

Determining whether a representation of a masked feature for the consecutive frame corresponds to a representation stored in the feature bank may comprise computing a cosine similarity between the representation of the masked feature for the consecutive frame and the stored representation.

Correspondence between the representation of a masked feature for the consecutive frame and a representation stored in the feature bank may indicate a similarity between the features of the masked feature for the consecutive frame and features of the masked feature of the representation stored in the feature bank.

The features of a masked feature may comprise one or more of color of the object, edges of the object or corners of the object.

Extracting a masked feature for each of one or more objects of the first frame may comprise inputting the first frame into a convolutional neural network to extract semantic data indicative of one or more features of each of the one or more objects; segmenting the first frame to generate the initial mask for each of the one or more objects; and combine the initial mask with the semantic data to generate the masked feature for each of the one or more objects. The one or more features of the masked feature may comprise the semantic data indicative of one or more features of the respective object. The one or more features of the respective object may comprise one or more of color of the object, edges of the object or corners of the object. Extracting semantic data indicative of one or more features of each of the one or more objects may comprise applying one or more functions to the data of the first frame, the one or more functions comprising a convolution function, an activation function, a batch normalization function and a dropout function. Segmenting the first frame to generate an initial mask for each of the one or more objects may comprise performing a pixel-by-pixel comparison for the pixels of the first frame, the pixel-by-pixel comparison identifying groups of similar pixels, each group representing an object of the one or more objects of the frame. According to certain embodiments the segmentation comprises reducing the resolution of the first frame to produce a reduced frame (a frame of reduced size) and performing the pixel-by-pixel comparison for the pixels of the reduced frame. This may be achieved by arranging the reduced resolution frame along a single dimension and then performing the pixel-by-pixel comparison.

According to further aspects embodiments provide a computer readable medium having instructions thereon configured to cause one or more processors to perform the methods of any one of the first, second or third aspects.

Where functional modules or units are referred to in apparatus embodiments for carrying out various functions, or steps of the described method(s), it will be understood that these modules or units may be implemented in hardware, in software, or a combination of the two. When implemented in hardware, the modules may be implemented as one or more hardware modules, such as one or more application specific integrated circuits (ASICs), or field programmable gate arrays (FPGAs). When implemented in software, the modules may be implemented as one or more computer programs that are executed on one or more processors.

BRIEF DESCRIPTION OF THE DRAWINGS

The accompanying drawings are presented to aid in the description of various aspects of thereof.

DETAILED DESCRIPTION OF THE DRAWINGS

The present disclosure relates to improvements to techniques such as video instance segmentation (VIS). VIS is the process of segmenting objects (also referred to herein as object instances, or just instances) in a video stream and then tracking those objects within the video stream. This requires the segmentation of objects from each video frame. This may be done by pixel classification for the object. For example, collections of pixels may be classified as an object such as a person, pet, vehicle etc., which may be done by various techniques discussed further herein. As objects are segmented from each frame, associations need to be determined between frames such that the same object is tracked between frames. This allows, for example, a mask (such as a color mask) to be applied to the same object consistently across frames (for example the same object can be highlighted in blue across all frames in which the object appears).

Figure 1:
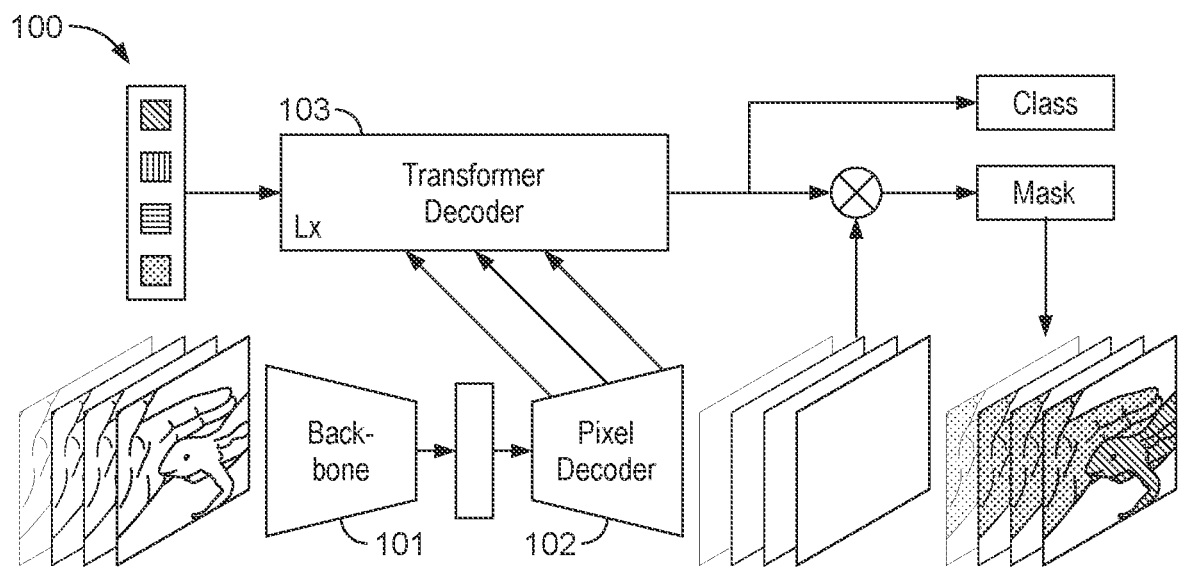
FIG. 1 is a schematic representation of an exemplary existing video instance segmentation system.

Thus, VIS is more complex and challenging than many other computer vision tasks. Various solutions have been proposed for VIS, for example DETR, VisTR, IFC, Seq-Former, Mask2Former-VIS, etc. These solutions treat a video clip as a 3D spatial-temporal volume and directly predict the 3D mask for each instance. Mask2Former-VIS 100 is an example of the current state of the art and is shown in FIG. 1 in which input video is passed through a backbone 101, a pixel decoder 102 and a transformer decoder 103, instance segmentation is carried out to generate masks for the video and an adjusted video stream is output in which the mask is overlaid on the instances of the video.

Various technical challenges have been appreciated.

Figure 2:
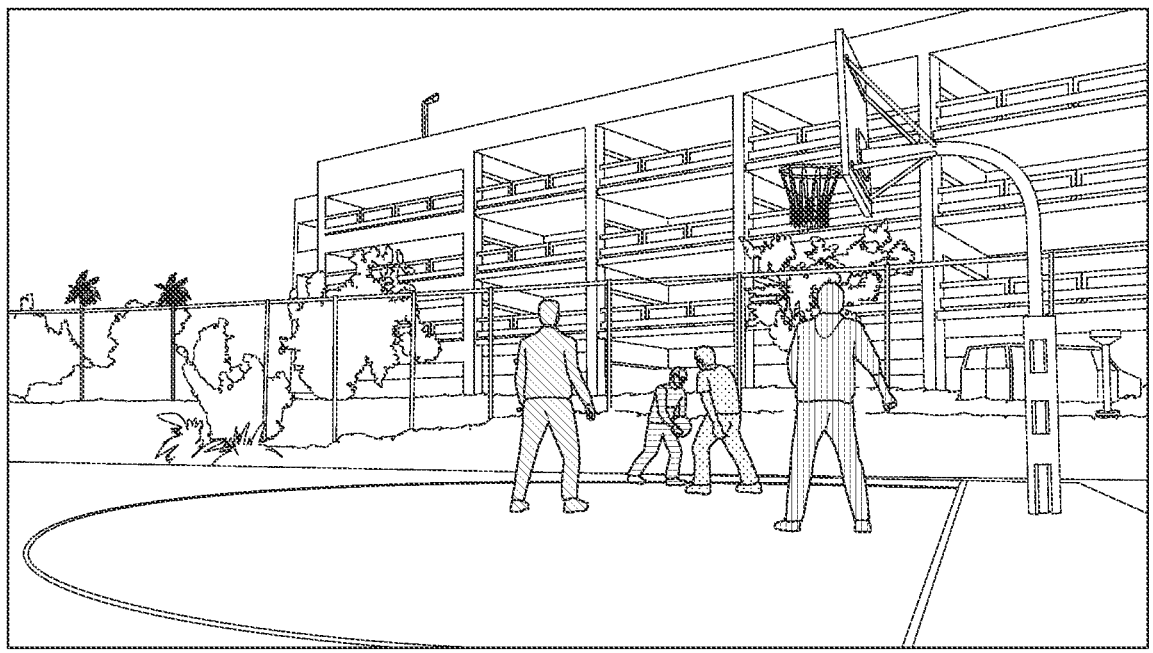
FIG. 2 is an example of a video instance segmentation output frame.

Challenge 1: Precise segmentation on every single frame. This is a pixel-wise classification problem. The process needs to classify every pixel on frames as one of the potential categories (as well as background). Referring to FIG. 2, this particular example is directed to persons (in real-life application scenarios, more categories can be included). Thus, the segmentation process needs to classify every pixel into either the "Person" or the "Background" category. In FIG. 2, all person pixels are highlighted using color masks, while the brightness of background pixels is dimmed. For ease of illustration, the different colors between persons are shown in FIG. 2 with different hash/line patterns, each different pattern representing a different color. For example, the person on the right hand side of the basketball court is highlighted with a straight line pattern, which may illustrate, for example, a red highlight. The diagonal line pattern may represent a green highlight, the straight horizontal pattern a blue highlight, and the dotted pattern may represent a yellow highlight. It will be appreciated that the mapping between color and pattern is simply for illustrative purposes and different colors may be used. Alternatively, the persons may in fact be visually highlighted using hash/line/dot patterns rather than colors, in which case, the output will look visually comparable to FIG. 2. In the following, if there is reference to a "color" used in an embodiment to highlight an object, which is illustrated in the Figure by a line pattern, a dotted pattern etc., it should be understood, that the line/dot pattern is being used in the Figure to represent a particular color.

Challenge 2: Precise Instance Separation. The process also needs to distinguish different individuals belonging to the same category. As illustrated in FIG. 2, there are four people playing basketball in this image. Among all pixels that were predicted as "Person," the process also needs to know which pixel belongs to which person. In FIG. 2, different colors are used to indicate different people.

Challenge 3: The segmentation and instance separation results of consecutive video frames should be as consistent as possible. Because people in videos are usually moving, which causes their poses, facing directions, lighting, sizes, etc., change significantly (as shown in FIG. 2). The model needs to generate consistent segmentation and instance separation results (to be robust to all these variances).

Figure 3:
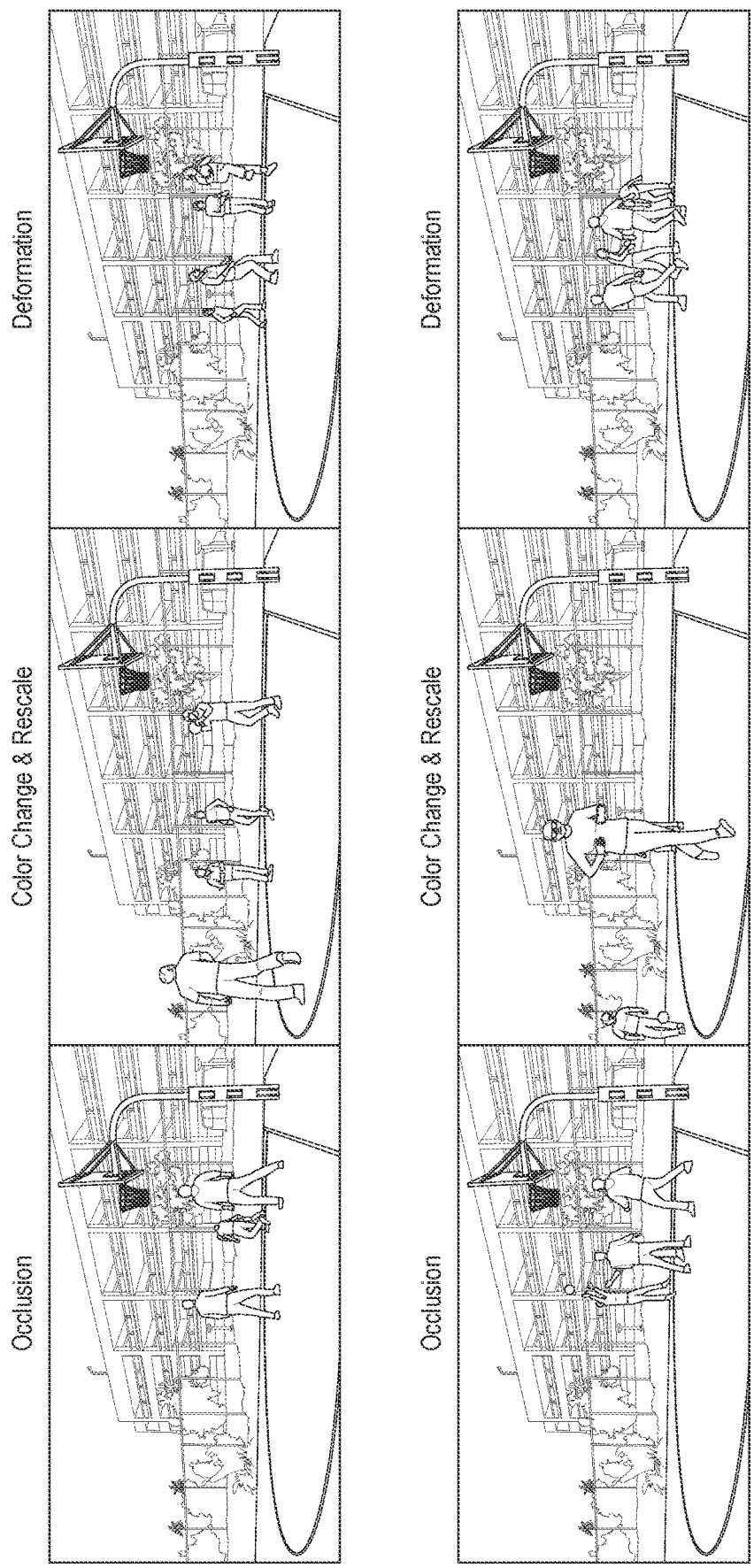
FIG. 3 shows a number of frames showing examples of object variations in a video stream.

Challenge 4: The model needs to associate segmented instances among frames. In most scenarios, especially in sports videos, people move fast, and there are many occlusions, color changes, rescale, etc. Different examples of this are illustrated in FIG. 3, including, from left to right, examples of occlusion, colour change and rescale (e.g. due to changes in lighting), and object deformation (e.g. due to changes in posture of a person between frames). Thus, it is challenging to match people among frames.

Existing solutions do not address all these challenges. Some drawbacks to existing solutions are as follows.

The ability to only process short video clips. For example, Mask2Former-VIS can only process 70 frames (2.8 seconds long, 1080×1920 resolution) at a time on an NVIDIA RTX A6000 GPU (more frames will cause an out-of-memory error). It is worth highlighting that an NVIDIA RTX A6000 GPU is a powerful GPU with 48 GB memory, and the Mask2Former-VIS can only process a video clip with up to 8 frames (0.32 seconds long, 1080×1920 resolution) running on an NVIDIA GeForce RTX 2080 GPU (11 GB memory). Please refer to the Performance section below for more details.

Figure 4:
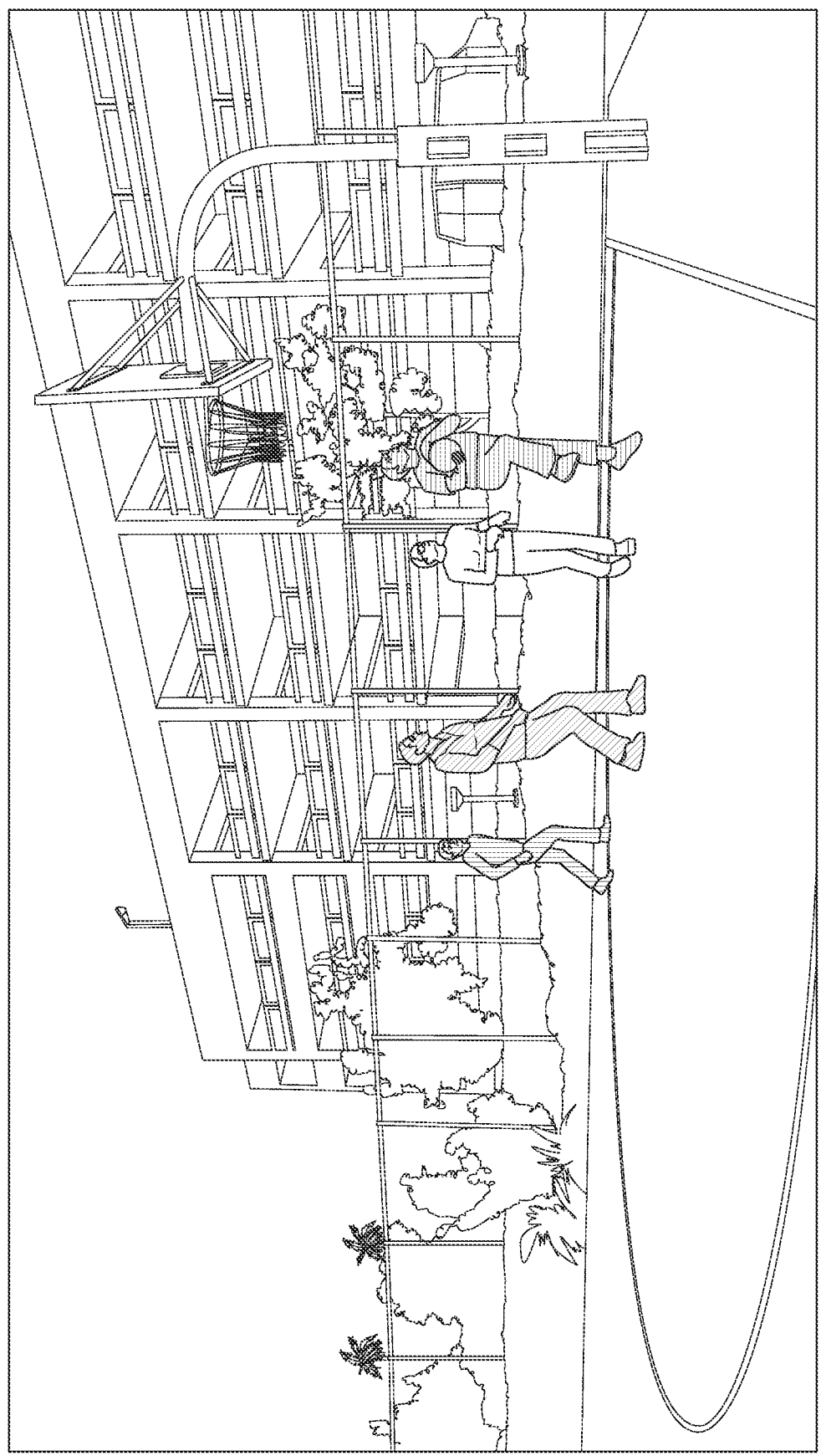
FIG. 4 is an exemplary failure case for an existing video instance segmentation.

Inability to handle variations, e.g., occlusions, lighting changing, etc. In other words, when variations happen, segmentation and tracking results systems such as Mask2Former-VIS may be sub optimal (as illustrated in FIG. 4). The performance degradation may be caused by a process flaw. For example, the models being used may regard all input video frames as a volume and extract general global features from all frames simultaneously (the feature of one frame has connections to features of other frames). The final prediction outputs are based on the extracted global features. When variations happen (features change significantly), the models cannot adapt to these special features, which results in worse performance.

Object instances may be missed. Some existing solutions may only be able to generate segmentation masks for a small number of objects, ten for example. When a video clip (instead of on each frame) consists of more than the ten object limit, the system may miss instances in its outputs. In addition, existing solutions also miss instances when the extraction of global features from the input video clips has degraded, for example when variations happen. As shown in FIG. 4, the second person on the right side is ignored by the Mask2Former-VIS process.

Long computation time. For example, Mask2Former-VIS extracts 3D (spatial+temporal) features from video clips. It takes a long time to extract such a feature and make predictions.

Some solutions may be suitable for offline application scenarios only. For example, Mask2Former-VIS is only suitable for offline application scenarios. It cannot start working until a video clip recording is completed. Thus, Mask2Former-VIS cannot be used in online application scenarios.

To address the above, a frame-based Video Instance Segmentation process and system according to the present disclosure is provided.

System Overview

Figure 5:
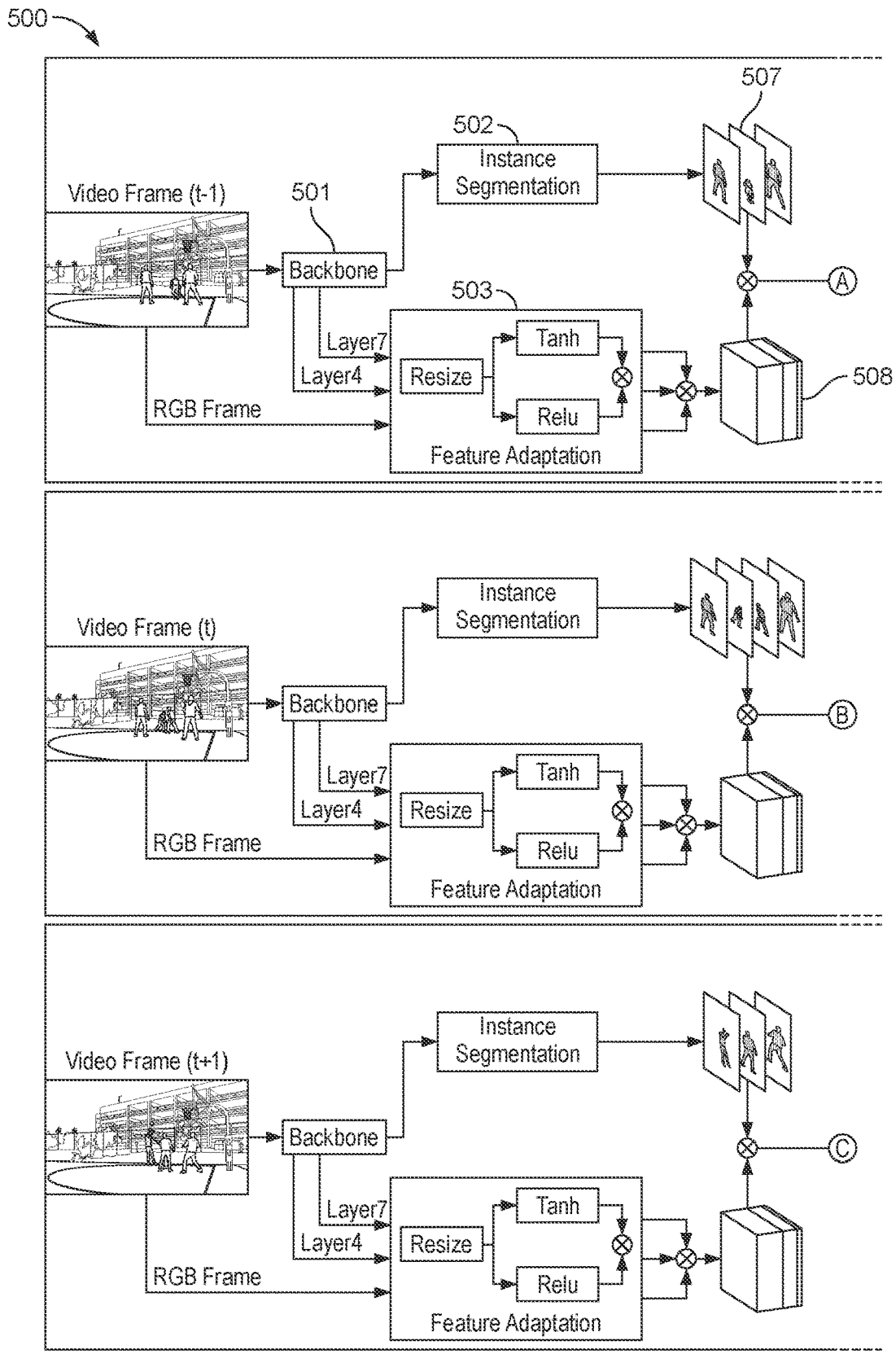
FIG. 5 is a schematic representation of an exemplary video instance segmentation system according to aspects of the disclosure.
Figure 5:
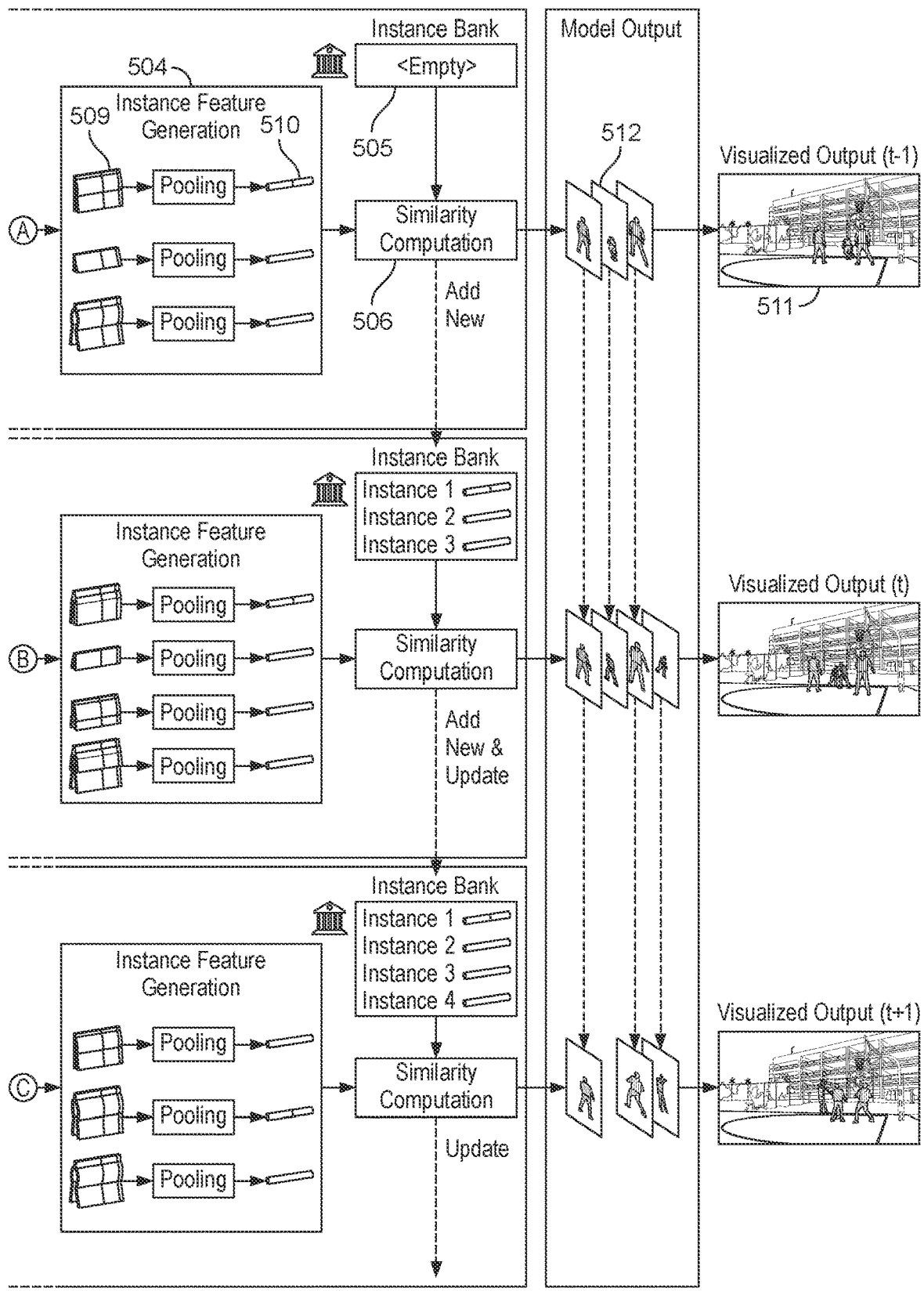

In FIG. 5, an embodiment according to the present disclosure is shown. Specifically, a VIS system 500 is shown comprising the following modules: (1) Backbone Module 501, (2) Instance Segmentation Module 502, (3) Feature Adaptation module 503, (4) Instance Feature Generation Module 504, (5) Instance Bank 505, and (6) Similarity Computation Module 506. Each module may be implemented by suitable hardware and/or software, for example, one or more processors configured to execute the functions of each module. Alternatives are possible, for example each module may be implemented by dedicated hardware, or the modules may be grouped together with two or more modules implemented in a single hardware module. In the following sections, we will describe these modules in detail. It is noted that the functions of each module described herein are repeated for each frame of a video stream.

The Backbone Module 501 and the Feature Adaptation module 503 may receive a first frame of video data (e.g. frame (t−1), the first frame comprising one or more objects. Objects here may mean data objects—i.e. collections of pixels that correspond to/represent a real world object. The Instance Segmentation Module 502 and the Feature Adaptation module 503 may extract a masked feature, e.g. masked features 509, for each of one or more objects of the first frame by combining an initial mask 507 for each object with one or more extracted features 508 of the frame. The extracted features 508 of the frame may be referred to herein as a feature map for the frame in question. Instance Feature Generation Module 504 may generate a representation (e.g. a feature vector) of each masked feature, the representation being indicative of one or more features of the masked feature. Instance Bank 505 (also referred to as a feature bank herein) stores each representation and an associated identification. The one or more processors of the system are further configured to adjust the first frame by applying each initial mask and the corresponding identification to the respective object of the one or more objects of the first frame, and output the adjusted first frame. The system tracks the one or more objects in one or more consecutive frames by utilising the modules of the system. In more detail, for each consecutive frame, the Instance Segmentation Module 502 and the Feature Adaptation module 503 extract a masked feature for each of one or more objects in the consecutive frame by combining an initial mask for each object with one or more extracted features of the object. Instance Feature Generation Module 504 generates a representation of each masked feature for the consecutive frame, the representation being indicative of one or more extracted features of the masked feature. The Similarity Computation Module 506 determines whether the representation of each masked feature for the consecutive frame corresponds to a representation stored in the Instance Bank 505. In response to determining that the representation of a masked feature for the consecutive frame corresponds to a representation stored in the Instance Bank 505, the one or more processors associate the initial mask for the consecutive frame with the identification of the corresponding stored representation, and update in the feature bank the corresponding stored representation with the corresponding representation of the masked feature for the consecutive frame. The consecutive frame is adjusted by applying each initial mask and the corresponding identification for the consecutive frame to the respective object of the one or more objects of the consecutive frame, and the adjusted consecutive frame is output by the system.

Backbone Module

Figure 6:
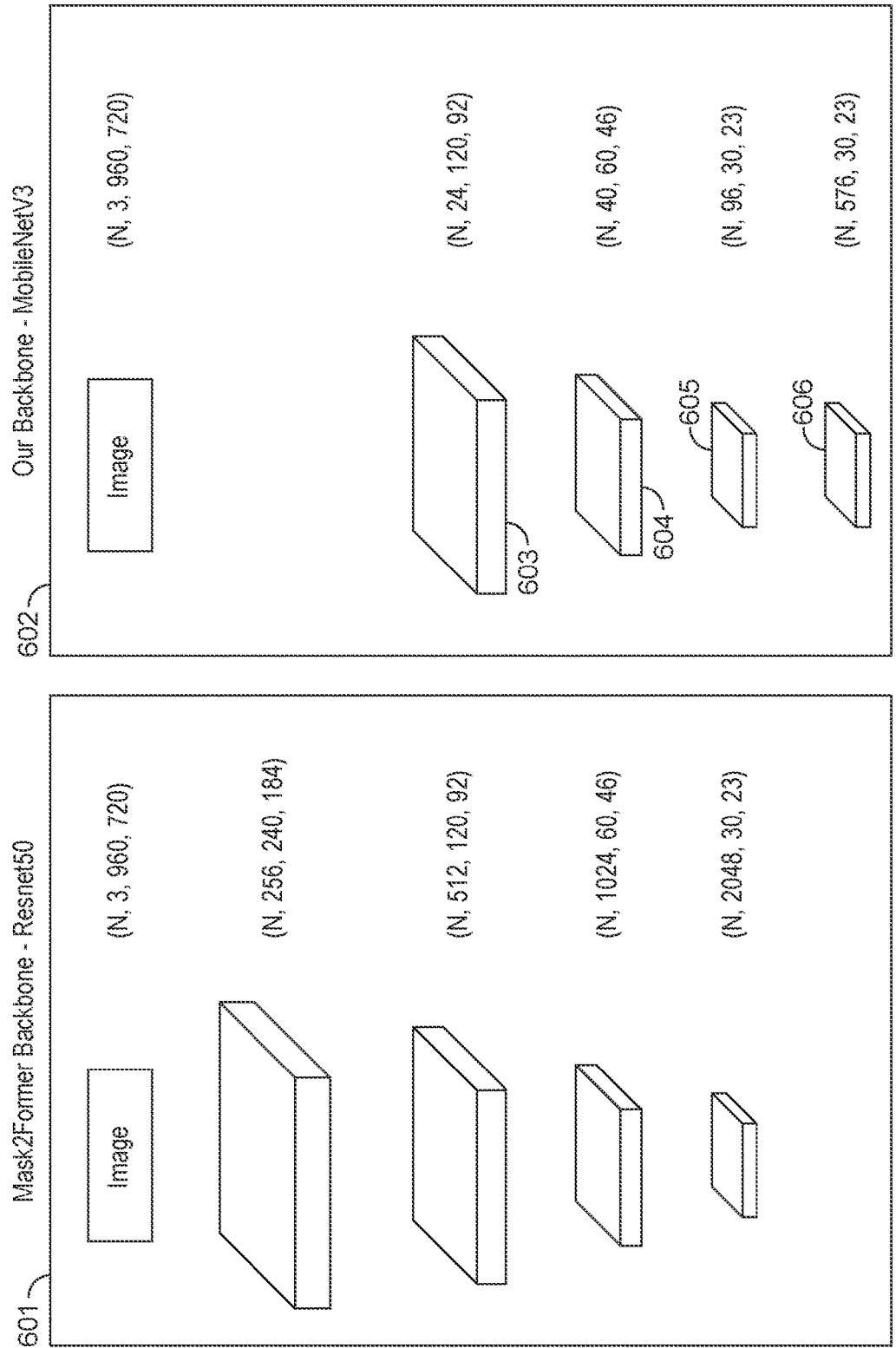
FIG. 6 is a schematic representation of an exemplary Backbone Module for implementing aspects of the disclosure.

The Backbone Module 501 extracts spatial features (2D from every input video frame. The features are features of the objects of the frame (for example, object color, corners or edges of the object, aspects of the object like an arm or leg of a person etc.). The Mask2Former-VIS uses ResNet50 as its default backbone. In the embodiment of FIG. 5, a MobileNetV3 is used, which is pre-trained on the ImageNet dataset for its lightweight arrangement (faster speed and fewer resource usage) and good performance. This is shown in FIG. 6 where the Mask2Former-VIS Backbone 601 is shown on the left and the MobileNetV3 backbone 602 used in the present embodiment is shown in the right. However, it will be appreciated that any appropriate convolutional neural network, CNN, backbone may be used.

The MobileNetV3 backbone comprises multiple functional layers, which have been grouped into four functional blocks 602 which each comprises one or more functional layers. It is noted that the grouping of the layers into the 4 blocks of FIG. 6 is for illustration and for ease of comparison with the ResNet50 arrangement, which comprises more functional blocks than MobileNetV3. Each block comprises a number of functions (layers), and each block may comprise a different combination of functions resulting in a different output, and can thus be selected for use based on the type of output required. Each layer may be assigned a numerical I.D. to distinguish between the layers and their respective functions. For example, block 603 may comprise a convolution function as a first layer, with I.D. Layer1, an activation function Layer2, a batch normalization function Layer3, and a dropout function Layer4. Each layer operates on the image data and produces a certain output. Block 604 may comprise a convolution function Layer5, an activation function Layer6 and a batch normalization function Layer7. Blocks 605 and 606 may have a different combination of functions represented by further layers—e.g. Layer8 onwards. Generally, each block represents a combination of functions that can be appropriately grouped together in order to produce a certain output. For example, block 603 combines the functions of Layer1 to Layer4 to produce an output that, for example, extracts low level semantic meaning features such as edges or corners of the image frame objects. Engaging block 603, requires operation of block 603 on the data (so Layer1 to Layer4). The block of functions for block 603 then receives the data produced by block 603 and operates, with Layer 5 to Layer 7 on that data to produce intermediate level semantic meaning features, such as data on the arms or legs of the frame objects. The lower Layers—Layer8 onwards—provide higher level semantic meaning, e.g. persons, background, sky etc. However, as in the present embodiment it is necessary to distinguish between persons, the higher level semantic meaning is not needed, as it would not distinguish between individual persons, only between the category of persons and background or sky etc. Thus, outputs from Layer4 and Layer7 are chosen as they output data that facilitates in tracking different persons between frames—certain properties of each person (corners, edges, arms legs, etc.) are extracted that are helpful for identifying an individual between frames.

In this embodiment the Layer4 and Layer7 blocks are used, as shown in FIG. 5. It is noted that "use" of Layer4 implies engagement of the whole block 603, as Layer4 operates on data output from Layer3, and Layer7 operates on output from Layer6. In other words, use of Layer4 means operation on the data of block 603, and use of Layer 7 means operation on the data of block 603 followed by block 604. It is appreciated that other blocks may be used depending on the use case. It will also be appreciated that the blocks may have a different set of functions, and/or may have a different combination of functions. For example, the blocks may have one, two, or more functions. The functions of the layers may be implemented by a convolutional neural network or by suitable software implemented by one or more processors. The last two layers of the MobileNetV3 (the Average Pooling and the Classification layers) may be deleted if being used for the image classification task. Individual Layers can also be chosen for use. For example, Layer1 may be used only, or Layer3 may be used (which entails use of Layer1 and Layer2) etc.

As shown in FIG. 6, the image has a batch size of N (here it is set as N=1), a channel of 3, and a pixel height and width of 960 by 720. This may vary by use case. The data provided for each functional block may be compressed or reduced relative to the overall image size. For example, for the first block of MobileNetV3, the Channel number has increased but height and width has decreased. It is also noted that the first block 603 of the MobileNetV3 backbone has a reduced Channel number and data set height and width compared to the Mask2Former. This is advantageous as it reduces computational complexity and computation time, and thus increases performance speed.

Object Instance Segmentation Module

Figure 7:
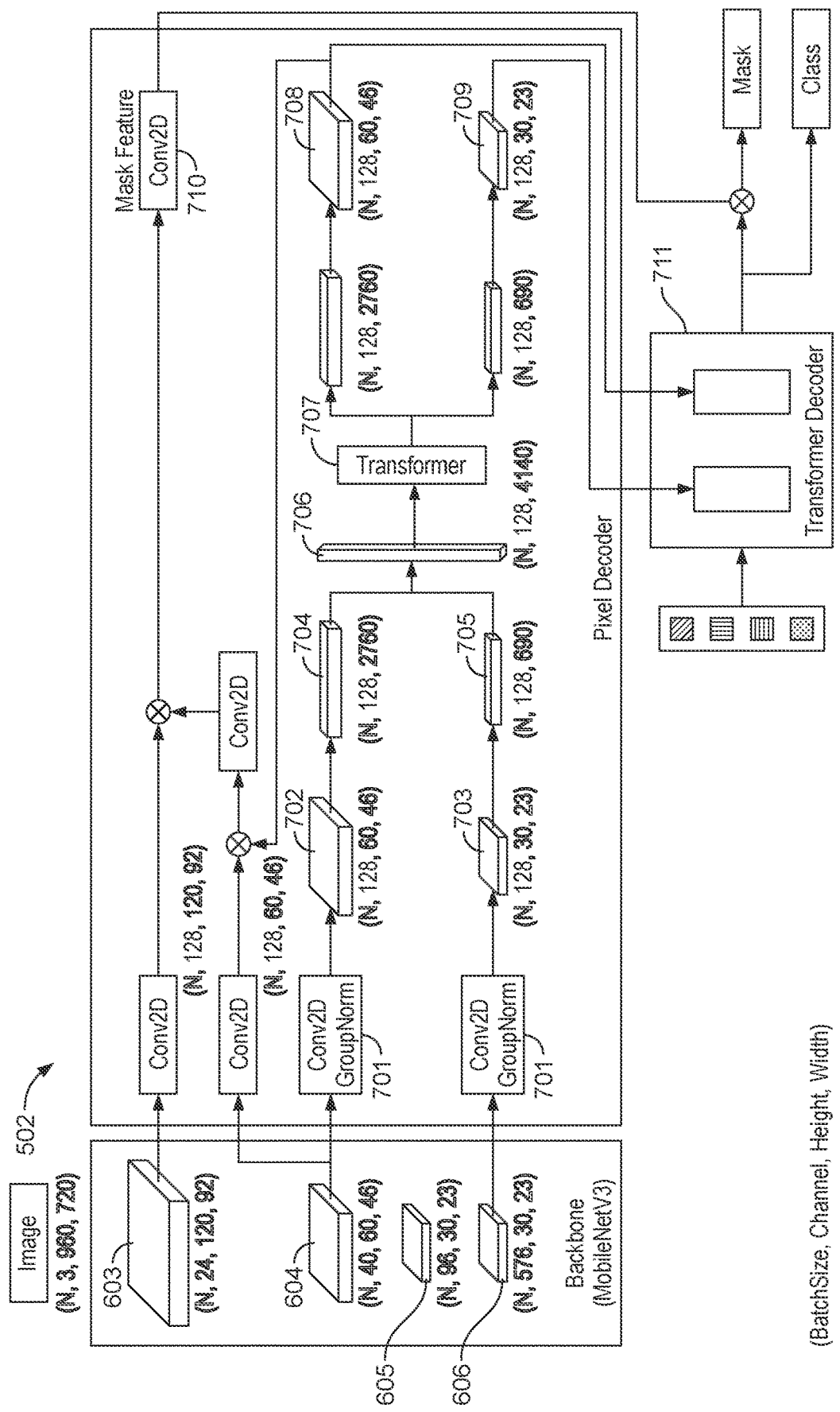
FIG. 7 is a schematic representation of an exemplary Instance Segmentation Module for implementing aspects of the disclosure.

The Instance Segmentation Module 502 generates a semantic mask for each detected instance (as shown in FIG. 5). FIG. 7 shows a preferred Instance Segmentation Module 502 for implementing aspects of the disclosure. It will be appreciated that any appropriate image instance segmentation works.

Outputs from block 603, block 604 and block 606 of backbone 600 are fed into the segmentation module 502.

Convolution and group normalization functions 701 are applied to outputs from blocks 604 and 606, to produce block 702 and 703. Block 702 has a Channel number of 128, a height of 60 and a width of 46. It is noted that blocks 604 and 606 may be a reduced resolution version of the input frame ($1/16$ and $1/32$ of the input resolution respectively). Block 703 has a Channel number of 128, a height of 30 and a width of 23. Other Channel numbers, heights and widths for either block 702 or block 703 may be used. Each block 702, 703 is then flattened along a single dimension. This results in a block 704 having a width of 2760, and a block 705 having a width of 690. This allows the blocks to then be combined into block 706 with a height of 3450, which may be achieved simply by concatenating each block 704, 705 along the single dimension.

Block 706 is then fed into transformer 707 which performs a pixel-by-pixel similarity computation to determine which pixels relate to the same object (e.g. the same person) in the image frame. This may be done by an appropriate matrix computation, for example. The similarity computation may compare, for example, pixel colour, to identify pixels of the same colour as identifying the same object. These pixels are then extracted to extract the object of interest from the image data. It is noted that this pixel-by-pixel similarity computation is performed on a reduced resolution frame that has been concatenated along a single dimension compared to the original image frame. In the embodiment of FIG. 7, the similarity computation is performed on a block with 3450 pixels along a single dimension, compared to the original image that is a 2D block of 960 by 720. Once the transformer 707 has identified which pixels belong to an object of the frame, reverse operations are performed to generate blocks 708 and 709, which have the same dimensions as blocks 702 and 703.

Block 708 is then concatenated with an output from block 604, to which a convolution has been applied to provide a block with the same resolution as block 708. A further convolution operation is then applied to the concatenated block to produce a block having the same resolution as the block 603. This block is then concatenated with a block that is a convolution of block 603 which has the same properties as block 603 except that the number of channels has been increased to match that of the mask block. This produces the final mask feature 710 which comprises the mask of the object identified by the transformer, but at the resolution of block 603.

Blocks 708 and 709 are then passed to a transformer decoder 711 where an appropriate initialized value—here a vector such as a 128 dimensional vector—is associated with the mask to identify the mask from the other masks being generated for the frame. The different value associated with a given mask is depicted by the four boxes to the left of the transformer decoder 711. These boxes illustrate that each mask may be associated with a different value. Each box may correspond to one instance of the final output. In FIG. 7, 4 boxes are shown (before the Transformer Decoder), indicating that there are 4 possible output instances (masks). If there are less than 4 instances in the input frame, the model will still output 4 instance masks (some of them may be empty, which mean no instance is found for the corresponding initialized vector). The initialized vector/value work as implicit clues for the following instance segmentation. The values/vectors may be pre-trained. The output of the transformer decoder 711 is then combined with the full resolution mask feature by a matrix multiplication operation to produce the masks 507, which is output from the Instance Segmentation Module 502 as shown in FIG. 5. Masks 507 may be referred to herein as initial masks that have not yet been combined with semantic meaning features extracted by the Backbone Module 501 and the RGB data from the input frame. The result of this combination is masked feature 509 discussed further below. It is noted that in other embodiments it may not be colour that is applied by the transformer decoder but another property that supplements the masking, for example, an object weighting to highlight one object more than others. The class of the mask feature is also provided, for example, whether the mask feature is a person, object, sky, etc.

It is noted that this process generally follows the structure used in the Mask2Former segmentation process. A difference between the instance segmentation of the embodiment of FIG. 7 and that of the Mask2Former is that block resolutions are reduced compared to Mask2Former (as discussed in relation to FIG. 6) and block 605 is ignored in the embodiment of FIG. 7 due to it having the same resolution as block 606, and thus being largely redundant. These differences are advantageous as they reduce computational complexity and computation time. However, it will appreciated that alternatives are possible, depending on use case and implementation details.

Feature Adaptation Module

The Feature Adaption module 503 normalizes features before feeding them to the following modules. Specifically, features from the 4th and 7th layers of the MobileNetV3 backbone 501 are extracted as discussed above and then fed into the Feature Adaptation Module 503 along with the normalized input RGB frame (e.g. normalized to [−1, 1]). After getting features, the Feature Adaptation module first resizes all features into a target resolution (e.g. ⅛ of the input frame solution). This is necessary as the input RGB frame, the Layer4 input and the Layer7 input may all have different resolutions. Following this, two activation functions (Tan h and ReLU) are used to process the features, for example removing negative values from the input data set. The output is the concatenation of all of the features (rgb_tan h+rgb_relu+4th_tan h+4th_relu+7th_tan h+7th_relu). In FIG. 5, different lines are used to highlight different features (original RGB, low level features, intermediate level features etc.). The reasons for choosing to use RGB frame, 4th layer feature, and 7th layer feature is because: (1) RGB frame provides color information, (2) 4th layer feature consists of low-level semantic information (e.g., edge, corner, etc.), and (3) 7th layer feature includes a little higher semantic information (e.g., texture, etc.) than the 4th layer. As discussed previously, features from higher layers (higher than the 7th layer) are not helpful for this instance segmentation task because they are high-level semantic information, so they are not intra-class distinguishable.

The output of this module is a concatenation of the data from the Layer7, the Layer4 and the RGB frame, as shown by the different layers of the feature map 508—the front layer corresponding to the Layer7 data, the middle layer corresponding to the Layer4 data and the thinnest back layer corresponding to the RGB data for the frame. As noted above, layers other than Layer4 and Layer7 may be used as appropriate.

It is noted that any appropriate feature adaptation may be used depending on the use case. For example, feature adaptation may only involve rescaling of the different input features to the same target resolution, or different layers other than Layer4 and layer7 may be used as discussed previously.

Instance Feature Generation Module

The Instance Feature Generation Module 504 generates instance-level distinguishable masked features, also referred to herein as masked features 509. Masked feature 509 is referred to herein as a masked feature because it is generated by performing an element-wise multiplication of "instance masks" 507 (each mask correspond to one instance, which can be regarded as binary masks, foreground pixels are is and background pixels are 0s) and the feature map 508 comprising the "adapted features" of the frame, which include the low-level and intermediate-level (and in some cases high-level) semantic meaning features for the whole frame. The is of each mask—which represent the portion of the frame corresponding to the object in question—are multiplied by corresponding features of the feature map, which extracts out the features for the corresponding object. Thus, 509 is a "masked feature" that consists of foreground semantic meaning features for the corresponding object and all background features, and features of other objects, are ignored. It will therefore be appreciated that there is one "masked feature" 509 for each object in the frame, with that particular masked feature comprising the various semantic meaning features that have been extracted for that object (edges, corners, color, arms, legs etc.). In other words, Instance Feature Generation Module 504 generates features that are capable—they comprise the necessary semantic meaning—to identify individual objects of the same class in a frame, for example, the features allow two individual persons to be distinguished from one another. As shown in FIG. 5, after receiving the outputs from the Instance Segmentation module 502 which provides the basic masks of each object identified for the frame, and the Feature Adaptation module 503, which provides semantic meaning for each object corresponding to an extracted mask (details of edges, or object properties like arms, legs etc.), as well as the original RGB data for the frame, an element-wise multiplication (a matrix multiplication) is performed. This allows the foreground features to be maintained while ignoring the background (e.g. the sky). This means each mask of 507 multiples the feature block 508 to generate one masked feature of 509. The output of this combining is masked features 509 that represent the masks 507 for the identified objects of the frame combined with data—the features—that allows the objects to be tracked between frames. For example, the color, shape, size etc. of the objects (as provided by the output of the Feature Adaptation Module 503) allow two objects of the same class to be distinguished from one another and then tracked from frame to frame. In this case, the Instance Feature Generation Module 504 performs a Global Average Pooling only within instances (the foreground) to get object instance-level feature vectors 510. A Global Average Pooling operation takes a feature with a shape of (B, C, H, W) as its input, and outputs (B, C, 1, 1) feature vector, where B is batchsize (B=1 in this case), C is the number of channels, H and W are the spatial dimensions. In this way, it is possible to convert features into vectors that can be used for the a similarity computation as discussed below. In other words, these vectors are representations of the masked features 509.

These feature vectors 510 are stored in Instance Bank 505.

To summarize the process thus far, the frame (t−1) is received by the Backbone Module 501 and Feature Adaptation Module 503. The Instance Segmentation Module 502, the Feature Adaptation Module 503 and the Instance Feature Generation Module 504 extract a masked feature for each object of the frame. The masked features 509 are then pooled into feature vectors 510.

Instance Bank

An Instance Bank 505 (which may also be referred to as a feature bank herein) is maintained by a suitable memory unit to store features of all detected object instances. The Instance Bank 505 is updated after each frame. As illustrated in FIG. 5, initially (e.g. for the first frame of the video stream), the Instance Bank 505 is empty. The process described herein segments three instances from the first frame (Video Frame (t−1)). All of them are added to the Instance Bank 505.

On the second frame (Video Frame (t)), the process described herein is repeated. Briefly, the frame is passed to the backbone 501 which outputs to the instance segmentation module 502 which generates the initial masks 507 for the frame (t). The Feature adaptation module 503 receives the input RGB frame as well as Layer4 and Layer7 outputs from the backbone 501, to generate a layered block 508 representing the extracted features for frame (t). The layered block 508 for the frame (t) and the initial masks 507 for the frame (t) are combined through a matrix multiplication operation to generate the masked features 509 for the frame (t), which are then pooled to obtain four object instance vectors 510. Three of the four instances have vectors stored already in the Instance Bank 505, so the vectors in the Instance Bank 505 are updated with the new vectors. Here, the instance vectors from frame (t−1) are simply replaced by the corresponding vectors for frame (t), with the vectors for frame (t) being assigned the same identification, I.D., in the feature bank as its corresponding vector from frame (t−1). For example, the vector for the first segmented object in frame (t−1) is stored in the Instance Bank with an I.D. "Instance1". The same object is then identified and segmented in frame (t), matched with the vector Instance1 stored in the Instance Bank—i.e. determined that both vectors relate to the same object—and then saved in the Instance Bank as Instance1, replacing the existing Instance 1 vector currently stored in the Bank. In some cases, the identification may be the association of a vector with a color, the color then being the color applied with the corresponding mask on the output frame. Other appropriate ways of assigning an I.D. to each vector may be used. Although updating the Feature Bank 505 has been described as involving a replacement of an existing vector with a corresponding vector of the current frame, other updating processes are possible. For example, the existing vector may itself be updated based on the vector of the current frame, rather than being replaced entirely. For example, a weighted sum may be used such as weight*previous_vector+(1−weight)*current_vector. Alternatively, a CNN module may be trained to update the vector.

The fourth instance is new—it does not correspond to any vector in the Instance Bank 505—and so its corresponding vector is added to the Instance Bank 505.

Determination of whether a feature is a feature that already has a corresponding vector in the Feature Bank 505, or whether it is a new feature—i.e. a feature corresponding to an object that was not in a previous frame—is performed by the Similarity Computation Module 506. In other words, the tracking of objects between frames is achieved by comparing the similarity of the vectors extracted for a current frame against vectors stored in the Feature Bank 505.

Similarity Computation Module

The Similarity Computation Module 506 calculates the similarity between the feature vectors of instances of the current frame with feature vectors stored in the Instance Bank 505. determining whether the representation of a masked feature for the consecutive frame corresponds to a representation stored in the Instance Bank 505 comprises: comparing the representation of the masked feature for the consecutive frame with each stored representation; determining a similarity metric for each stored representation, the similarity metric indicative of the similarity between the representation of the masked feature for the consecutive frame and the stored representation; and determining, based on the similarity metrics, whether the representation of the masked feature for the consecutive frame corresponds to a representation stored in the feature bank. Here, a cosine similarity is used to measure the similarity of two feature vectors, although it will be appreciated that other appropriate similarity metrics may be used. The equation is $$CosineSimilarity(A, B) = \frac{A \cdot B}{\|A\| \, \|B\|}$$

where A·B is the dot product of A and B, and $\|\cdot\|$ calculates magnitude. As an example, vector A may represent a feature vector stored in the Feature Bank, such as the Instance1 vector determined for frame (t−1). Vector B may represent the corresponding vector determined for frame (t).

The vectors are indicative of one or more features of the masked feature. As such, correspondence between the representation of a masked feature for the consecutive frame and a representation stored in the feature bank indicates a similarity between the features of the masked feature for the consecutive frame and features of the masked feature of the representation stored in the feature bank. The features of a masked feature include features of the object associated with the masked feature. In more detail, the one or more features are features that allow one masked feature to be differentiated from each of the other masked features. In the case of FIG. 5, the one or more features may be object color (e.g.

color of the particular persons attire), semantic edge data, indicating the edges of a particular object, and semantic arm and leg data for the object. Other features may be used, such as object height, width, depth etc. and may depend on the use case.

The Similarity Computation Module 506 compares each vector extracted for a frame against each vector stored in the feature bank 505. In the embodiment of FIG. 5, for each vector extracted for a frame, a cosine similarity is calculated for each vector stored in the feature bank 505 (four vectors and three vectors respectively). If the cosine similarity between a vector of a first frame (e.g. frame (t−1)) and a vector of a second frame (e.g. frame (t)) meets a threshold value, it is determined that the vectors relate to the same object across the two frames. If the comparison of a vector of a current frame to the vectors stored in the feature bank results in more than one cosine similarity satisfying the threshold, the vector in the feature bank that has the largest cosine similarity with the vector of the current frame is identified as relating to the same object as the current vector. Once a feature vector for the current frame has been identified with a vector in the feature bank, the vector for the current frame may be assigned the I.D. of the vector in the feature bank. For example, if identified vector in the feature bank has a green color, a green color is chosen for the vector of the current frame. This is performed for each vector of the current frame so that the color identifying each initial mask for the current frame match the color identifying the corresponding initial mask of the previous frame (and on output, the mask and the associated color are applied to the corresponding object of the frame, as discussed in more detail below). It is noted that any suitable identification may be used other than color—numerical, for example, or other types of visual identification such as a visual pattern (hash, dot-dash etc.). As explained above, dot and line patterns are used in the Figures for ease of illustration, and each pattern may represent a color highlight or may itself be the visual highlight used to track objects. In other words, after doing similarity computation, it is known which instance generated for the current frame corresponds to which instance in the Instance Bank (or the previous frame). Then, the masks 507 may be reordered so that their order meets the instance order stored in the Instance Bank 505. Functionally, the final output of the model may be masks just like 507 but in a correct order, shown in FIG. 5 by masks 512.

If no vector comparisons reach the threshold, the vector of the current frame is determined to relate to an object that does not have a corresponding vector in the instance bank—i.e. it relates to an object first identified and segmented in the current frame.

The Similarity Computation Module 506 performs this vector comparison for every frame ensuring that any object appearing across frames that is identified and segmented is assigned the same feature vector I.D. from frame to frame. This I.D. may be derived from the order in the instance bank (and the order of the reordered masks of the current frame), or the I.D. may simply be the order. In some cases, the I.D. may include an associated visualization, such as a color or appropriate hashing or other way of visually highlighting the relevant object to the user. This allows a mask to be consistently applied to the object from one frame to the next even if the object changes position or orientation across frames. For example, Instance1 may be associated with a green color (shown in the figures as a diagonal line pattern, for example). The correct mapping of Instance1 to the same object (e.g. the same person) appearing from frame to frame, ensures a green mask is consistently applied to the same object from frame to frame. Here the I.D. is a green color associated with the first entry in the Instance Bank 505. This allows for effective tracking of objects of the same category between frames.

Output Frame

Once the vectors 510 and the associated I.Ds. have been generated for a frame, the initial masks 507 are applied to the original input frame along with the I.D. to produce the output frame 511. The masks are applied to each of their corresponding objects within the frame. In the example of FIG. 5, the objects are persons, and each person as a corresponding mask and associated color (the identification for the mask) laid over it in the output frame.

Instance segmentation results may be visualized on the frame by painting each instance using their corresponding colors (each ID has a pre-designed color) and then overlapping it in the RGB frame. It is worth highlighting, this visualization part is for user to check the quality of output masks. It is possible to do any other processes based on the model output (ordered instance masks), e.g., background bokeh, remove specific instances from videos, auto zoom in or zoom out for one particular person, etc.

Figure 8:
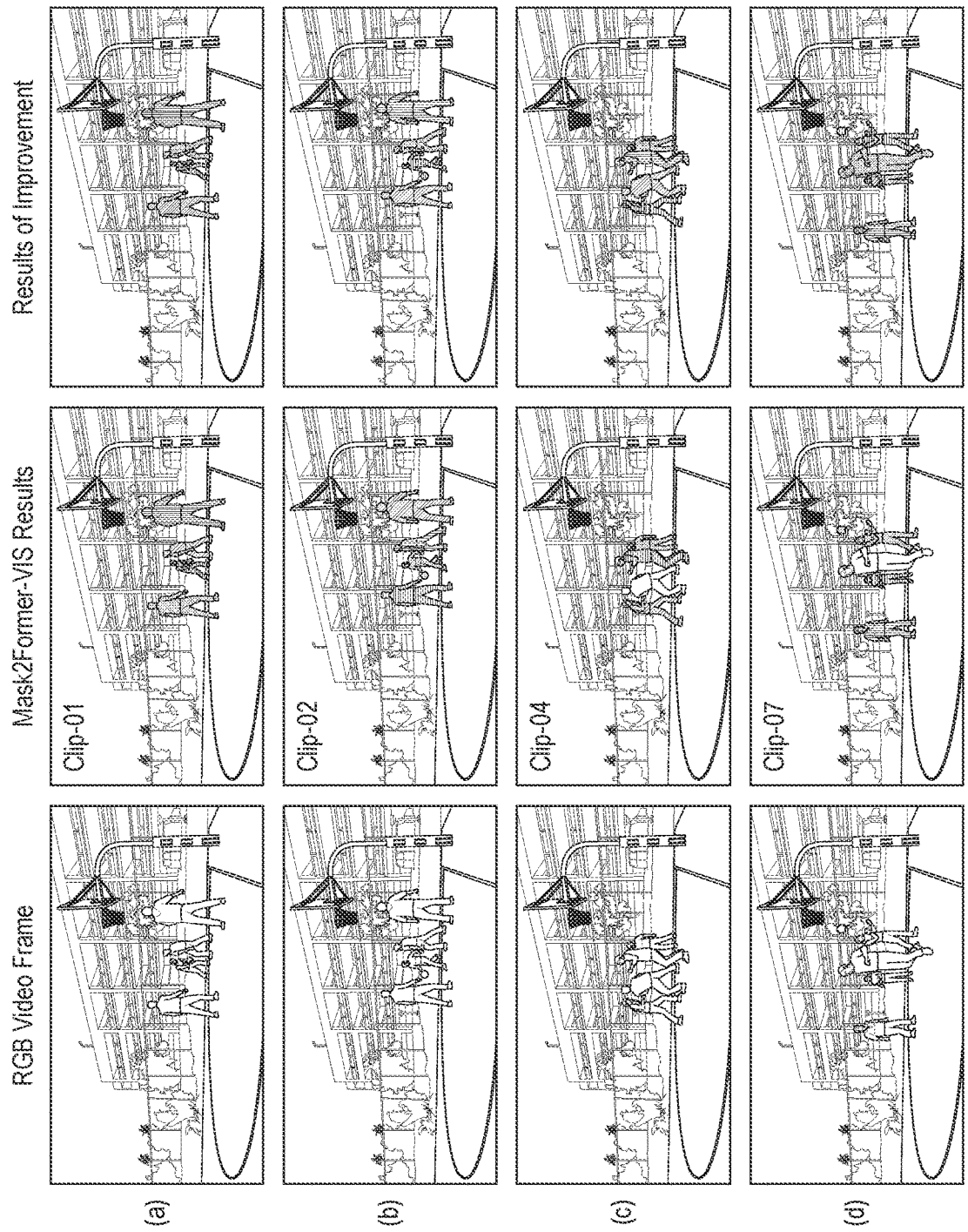
FIG. 8 shows a comparison of output frames generated without video instance segmentation, with a Mask2Former-VIS process and with an exemplary process of the present disclosure.

Frames are output with each frame having updated masks and I.Ds. applied thereon. As shown in FIG. 8, a sequence of output frames are shown. The left hand column represents the raw RGB frame. The middle column represents output frames due to the Mask2Former-VIS process. The right hand column represents the results of the techniques of the disclosure. It can be seen in the right hand column that across frames a) to d) the same frame objects—here persons—have the same masks overlaid thereon (on object, for example, being highlighted by a red mask in each frame). This is despite changes in position and orientation of the objects between frames.

The sports video used for the frames of FIG. 8 is 30 seconds long (750 frames). This test video consists of different variations, e.g., multiple times occlusions, large deformations, fast movements, changes in lighting and scale, etc. To generate results using the Mask2Former-VIS, the test video needed to be split into multiple short clips. In particular, the video was split into 11 clips, and each clip has up to 70 frames.

In contrast, according to the solution presented herein the video is processed frame by frame without any special pre-processing like the Mask2Former-VIS. FIG. 8 shows the visualization comparison between the results according to the present disclosure and the Mask2Former-VIS on the testing video. Different colors are used to indicate different instances throughout the video, which means the same instances on different frames are highlighted using the same color. The results according to the present disclosure are an improvement over the Mask2Former-VIS. Specifically, (1) the Mask2Former-VIS cannot correctly track instances for a long-term video, (2) the Mask2Former-VIS misses instances in FIG. 8(c), and (3) the Mask2Former-VIS generates a suboptimal segmentation result for the front person in FIG. 8(d). However, according to the techniques of the present disclosure nearly perfect video instance segment results are achieved for this challenging testing video.

It is also noted that the computation time for the techniques of the present disclosure are reduced compared to the Mask2Former-VIS. All results were collected by running the model on an NVIDIA RTX A6000 GPU. The computation time was measured for processing a video clip (70 frames)

and average over 10 runs. The solution presented herein runs 10 times faster than the Mask2Former-VIS.

Process

Figure 9:
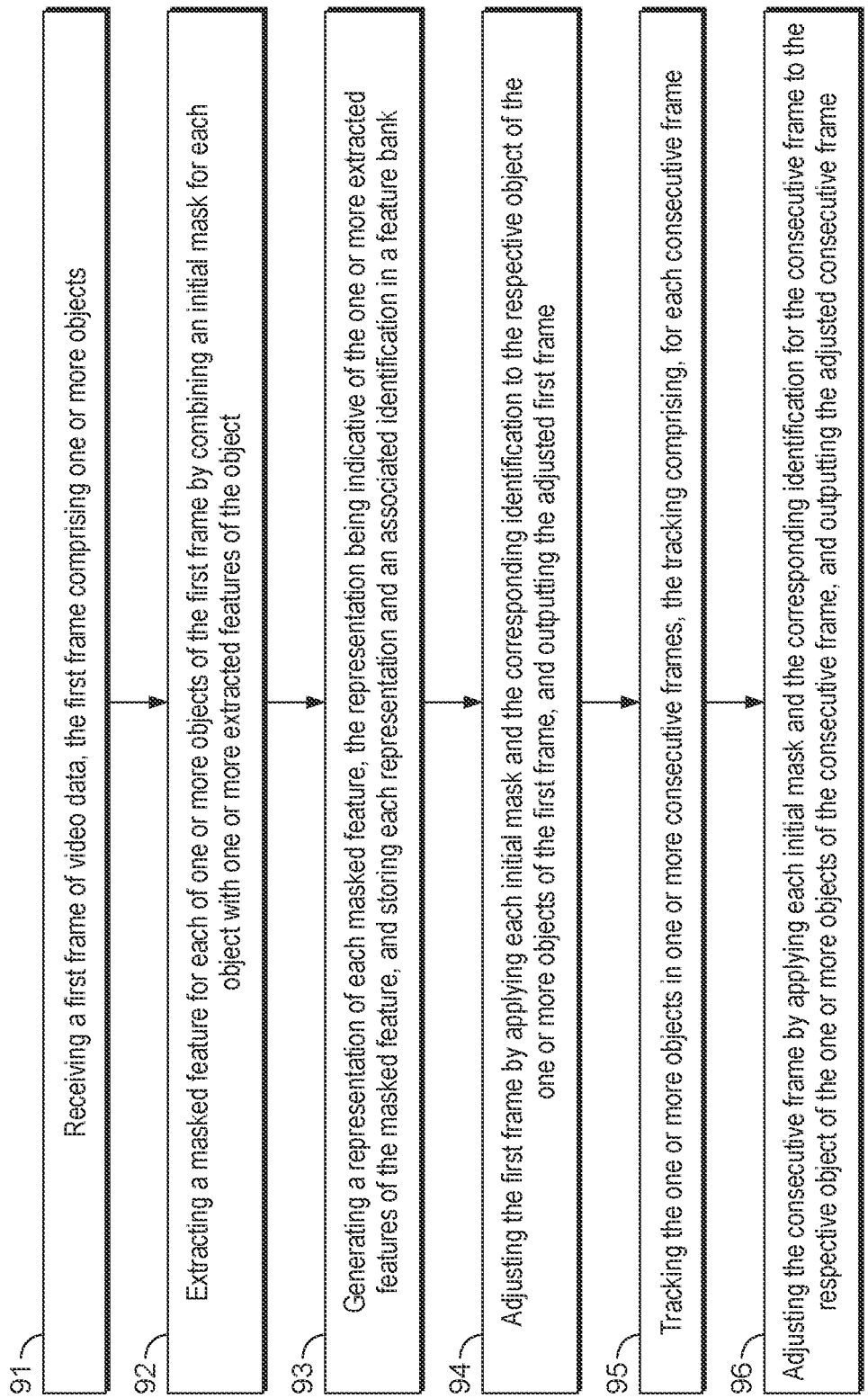
FIG. 9 is a flow diagram illustrating a video instance segmentation process for according to aspects of the disclosure.
Figure 10:
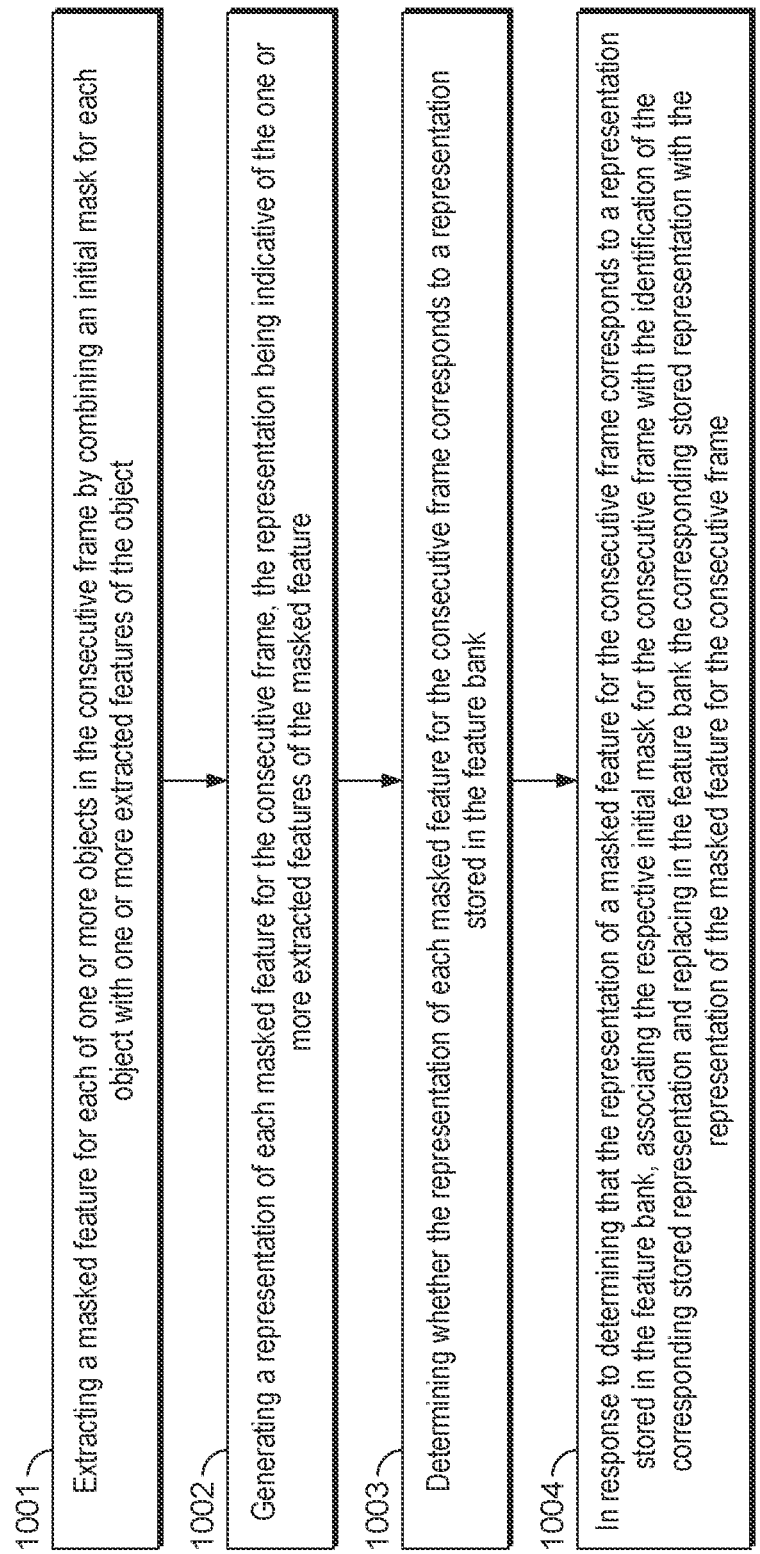
FIG. 10 is a flow diagram illustrating video instance segmentation process steps for according to aspects of the disclosure.

Having discussed each module of the VIS system of FIG. 5 in turn, the end to end process according to aspects of the disclosure will now be discussed. According to aspects of the disclosure, the method shown in the flow diagrams of FIGS. 9 and 10 is performed. This may be by the VIS system 500 shown in FIG. 5, or another suitable system.

At step 91, a first frame of video data is received. In the embodiment of FIG. 5, the first frame (t-1) is received by the backbone 501 and the feature adaptation module 503. The first frame comprises one or more objects. At step 92, a masked feature is extracted for each of one or more objects of the first frame by combining an initial mask for each object with one or more extracted features of the object. This may be the masked features 509, generated by the combining of the output of the instance segmentation module 502 with the feature adaptation module 503 by a matric multiplication operation. A representation of each masked feature is generated at step 93, the representation being indicative of one or more extracted features of the masked feature. The representation may be the feature vectors 510 obtained by the pooling operation of the masked features 509. The feature vectors are indicative of the features of the masked features that allow differentiation between the masked features. For example, the one or more features are properties that allow one masked feature to be differentiated from each of the other masked features. In the case of FIG. 5, the one or more features may be object color (e.g. color of the particular persons attire), semantic edge data, indicating the edges of a particular object, and semantic arm and leg data for the object. Other features may be used, such as object height, width, depth etc. and may depend on the use case. Each representation and an associated identification is stored in a feature bank, for example Instance Bank 505. At step 94, the first frame is adjusted by applying each initial mask and the corresponding identification to the respective object of the one or more objects of the first frame, and the adjusted first frame is output, to produce, for example, an output frame such as frame 511 of FIG. 5. The method further comprises, at step 95 tracking the one or more objects in one or more consecutive frames. In broad terms, this step comprises repeating the steps performed for the first frame for each consecutive frame, and for each consecutive frame, updating the feature bank with the representations of masked features calculated for the consecutive frame such that the initial masks track objects from frame to frame.

The tracking process is shown in FIG. 10 and comprises, for each consecutive frame, extracting a masked feature for each of one or more objects in the consecutive frame by combining an initial mask for each object with one or more extracted features of the object—step 1001. This may be performed in the same manner as for the first frame. The tracking further comprises step 1002 of generating a representation of each masked feature for the consecutive frame, the representation being indicative of one or more extracted features of the masked feature. Again, this is performed in the same manner as step 92 of FIG. 9 discussed above. Further, it is determined, at step 1003, whether the representation of each masked feature for the consecutive frame corresponds to a representation stored in the feature bank. This may be performed by the Similarity Computation Module 506 of FIG. 5 in the manner discussed above. In response to determining that the representation of a masked feature for the consecutive frame corresponds to a representation stored in the feature bank, the respective initial mask for the consecutive frame is associated with the identification of the corresponding stored representation. This is shown in FIG. 10 at step 1004. The tracking further comprises, updating in the feature bank the corresponding stored representation with the corresponding representation of the masked feature for the consecutive frame.

Returning to FIG. 9, the method further comprising, at step 96, adjusting the consecutive frame by applying each initial mask and the corresponding identification for the consecutive frame to the respective object of the one or more objects of the consecutive frame, and outputting the adjusted consecutive frame.

Advantages

Fast frame-based video instance segmentation. In particular, techniques of the present disclosure provide a frame-by-frame process rather than treating a video clip as a 3D spatial-temporal volume like legacy techniques. Providing a frame-based VIS (i.e. a VIS that is able to track objects frame-by-frame) allows for faster computation in solving the video instance segmentation task.

Innovative instance re-identification algorithm. Aspects involve a training-free, dataset-free instance re-identification method. The method extracts low-level features from the backbone module and employs, for example, two activation functions to normalize the features. The re-identification function is implemented by calculating cosine similarity among instance features of two frames.

Online solution capability. Techniques of the present disclosure can process video streams in real-time and process recorded videos without any modification. Whether video streams or pre-recorded videos, the process is frame by frame and outputs instance segmentation results for each frame. However, the Mask2Former-VIS can only handle pre-recorded videos.

Hardware friendly. As this is a frame-based solution, no matter how long the input video is, there is not an unacceptably large impact on the resource usage (it only needs a small increase in storage for the Instance Bank). However, the Mask2Former-VIS requires more GPU usage to process longer videos.

Dataset friendly. As a frame-based solution, we only need to train the CNN backbone on datasets with frame-level annotations (instead of video-level annotations). However, the Mask2Former-VIS can only be trained on datasets with video annotations (obtaining such a dataset is labor-intensive and time-consuming). It is much more efficient to access datasets with frame-level annotations than datasets with video-level annotations.

Flexibility. There is flexibility in modifications. In theory, any frame instance segmentation model (as well as the backbone) may be used. Only the backbone and the instance segmentation modules require training, and the Feature Adaptation module, Instance Feature Generation Module, Instance Bank, and Similarity Computation Module are training free. Thus, the instances matching function can be easily embedded into other backbones, instance segmentation modules, or other tasks (e.g., tracking).

What is claimed is:
1. A method for object tracking between frames of video data, the method comprising:
receiving a first frame of video data, the first frame comprising one or more objects;

extracting a masked feature for each of one or more objects of the first frame by combining an initial mask for each object with one or more extracted features of the object;

generating a representation of each masked feature, the representation being indicative of the one or more extracted features of the masked feature, and storing each representation and an associated identification in a feature bank;

adjusting the first frame by applying each initial mask and a corresponding identification to a respective object of the one or more objects of the first frame, and outputting the adjusted first frame; and tracking the one or more objects in one or more consecutive frames, the tracking comprising, for each consecutive frame:

extracting a masked feature for each of one or more objects in the consecutive frame by combining an initial mask for each object with one or more extracted features of the object;

generating a representation of each masked feature for the consecutive frame, the representation being indicative of the one or more extracted features of the masked feature;

determining whether the representation of each masked feature for the consecutive frame corresponds to a representation stored in the feature bank;

in response to determining that the representation of a masked feature for the consecutive frame corresponds to a representation stored in the feature bank, associating the initial mask for the consecutive frame with the identification of a corresponding stored representation;

updating in the feature bank the corresponding stored representation with a corresponding representation of the masked feature for the consecutive frame; and adjusting the consecutive frame by applying each initial mask and the corresponding identification for the consecutive frame to the respective object of the one or more objects of the consecutive frame, and outputting the adjusted consecutive frame.

2. The method of claim 1, wherein the one or more objects of the first frame comprise a plurality of objects.

3. The method of claim 2, further comprising, in response to determining that the representation of a masked feature for the consecutive frame does not correspond to a representation stored in the feature bank, storing the representation of the masked feature for the consecutive frame as a new entry in the feature bank.

4. The method of claim 1, wherein determining whether the representation of a masked feature for the consecutive frame corresponds to a representation stored in the feature bank comprises:

comparing the representation of the masked feature for the consecutive frame with each stored representation;

determining one or more similarity metrics for each stored representation, the one or more similarity metrics indicative of similarity between the representation of the masked feature for the consecutive frame and the stored representation; and determining, based on similarity metrics of the one or more similarity metrics, whether the representation of the masked feature for the consecutive frame corresponds to a representation stored in the feature bank.

5. The method of claim 1, wherein extracting a masked feature for each of one or more objects in the consecutive frame comprises extracting a masked feature for each of a plurality of objects in the consecutive frame.

6. The method of claim 1 wherein the representation of a masked feature is a vector.

7. The method of claim 6, wherein determining whether a representation of a masked feature for the consecutive frame corresponds to a representation stored in the feature bank comprising computing a cosine similarity between the representation of the masked feature for the consecutive frame and the representation stored in the feature bank.

8. The method claim 1, wherein correspondence between the representation of a masked feature for the consecutive frame and a representation stored in the feature bank indicates a similarity between features of the masked feature for the consecutive frame and features of the masked feature of the representation stored in the feature bank.

9. The method of claim 8, wherein the features of a masked feature include comprises one or more of color of the object, edges of the object or corners of the object.

10. The method of claim 1, wherein extracting a masked feature for each of one or more objects of the first frame comprises:

inputting the first frame into a convolutional neural network to extract semantic data indicative of one or more features of each of the one or more objects;

segmenting the first frame to generate the initial mask for each of the one or more objects;

combining the initial mask with the semantic data to generate the masked feature for each of the one or more objects.

11. The method of claim 10, wherein the one or more features of the masked feature comprises the semantic data indicative of one or more features of a respective object of the one or more objects.

12. The method of claim 11, wherein the one or more features of the respective object comprises one or more of color of the respective object, edges or corners of the respective object, features of the respective object and aspects of the respective object.

13. The method of claim 10, wherein extracting semantic data indicative of one or more features of each of the one or more objects comprises:

applying one or more functions to the video data of the first frame, the one or more functions comprising a convolution function, an activation function, a batch normalization function and a dropout function.

14. The method of claim 10, wherein segmenting the first frame to generate an initial mask for each of the one or more objects comprises:

performing a pixel-by-pixel comparison for pixels of the first frame, the pixel-by-pixel comparison identifying groups of similar pixels, each group representing an object of the one or more objects of the first frame.

15. A non-transitory computer-readable medium comprising instructions that when executed cause one or more circuits of a device for processing data to carry out the method of claim 1.

16. A system for object tracking between frames of video data comprising one or more processors and a memory connected to the one or more processors, the memory storing instructions that when executed cause at least one processor of the one or more processors to be configured to:

receive a first frame of video data, the first frame comprising one or more objects;

extract a masked feature for each of one or more objects of the first frame by combining an initial mask for each object with one or more extracted features of the object;

generate a representation of each masked feature, the representation being indicative of the one or more extracted features of the masked feature, and storing each representation and an associated identification in a feature bank;

adjust the first frame by applying each initial mask and a corresponding identification to a respective object of the one or more objects of the first frame, and outputting the adjusted first frame; and track the one or more objects in one or more consecutive frames, the tracking comprising, for each consecutive frame:

extracting a masked feature for each of one or more objects in the consecutive frame by combining an initial mask for each object with one or more extracted features of the object;

generating a representation of each masked feature for the consecutive frame, the representation being indicative of the one or more extracted features of the masked feature;

determining whether the representation of each masked feature for the consecutive frame corresponds to a representation stored in the feature bank;

in response to determining that the representation of a masked feature for the consecutive frame corresponds to a representation stored in the feature bank, associating the respective initial mask for the consecutive frame with the identification of a corresponding stored representation;

updating in the feature bank the corresponding stored representation with a corresponding representation of the masked feature for the consecutive frame; and adjusting the consecutive frame by applying each initial mask and the corresponding identification for the consecutive frame to the respective object of the one or more objects of the consecutive frame, and outputting the adjusted consecutive frame.

17. The system of claim 16, wherein the one or more objects of the first frame comprise a plurality of objects.

18. The system of claim 17, further comprising, in response to determining that the representation of a masked feature for the consecutive frame does not correspond to a representation stored in the feature bank, storing the representation of the masked feature for the consecutive frame as a new entry in the feature bank.

19. The system of claim 16, wherein determining whether the representation of a masked feature for the consecutive frame corresponds to a representation stored in the feature bank comprises:

comparing the representation of the masked feature for the consecutive frame with each stored representation;

determining one or more similarity metrics for each stored representation, the one or more similarity metrics indicative of similarity between the representation of the masked feature for the consecutive frame and the stored representation; and determining, based on similarity metrics of the one or more similarity metrics, whether the representation of the masked feature for the consecutive frame corresponds to a representation stored in the feature bank.

20. The system of claim 16, wherein extracting a masked feature for each of one or more objects in the consecutive frame comprises extracting a masked feature for each of a plurality of objects in the consecutive frame.

21. The system of claim 16, wherein the representation of a masked feature is a vector.

22. The system of claim 21, wherein determining whether a representation of a masked feature for the consecutive frame corresponds to a representation stored in the feature bank comprising computing a cosine similarity between the representation of the masked feature for the consecutive frame and the representation stored in the feature bank.

23. The system claim 16, wherein correspondence between the representation of a masked feature for the consecutive frame and a representation stored in the feature bank indicates a similarity between features of the masked feature for the consecutive frame and features of the masked feature of the representation stored in the feature bank.

24. The system of claim 23, wherein the features of a masked feature include comprises one or more of color of the object, edges of the object or corners of the object.

25. The system of claim 16, wherein extracting a masked feature for each of one or more objects of the first frame comprises:

inputting the first frame into a convolutional neural network to extract semantic data indicative of one or more features of each of the one or more objects;

segmenting the first frame to generate the initial mask for each of the one or more objects;

combining the initial mask with the semantic data to generate the masked feature for each of the one or more objects.

26. The system of claim 25, wherein the one or more features of the masked feature comprises the semantic data indicative of one or more features of a respective object of the one or more objects.

27. The system of claim 26, wherein the one or more features of the respective object comprises one or more of color of the respective object, edges or corners of the respective object, features of the respective object and aspects of the respective object.

28. The system of claim 25, wherein extracting semantic data indicative of one or more features of each of the one or more objects comprises:

applying one or more functions to the video data of the first frame, the one or more functions comprising a convolution function, an activation function, a batch normalization function and a dropout function.

29. The system of claim 25, wherein segmenting the first frame to generate an initial mask for each of the one or more objects comprises:

performing a pixel-by-pixel comparison for pixels of the first frame, the pixel-by-pixel comparison identifying groups of similar pixels, each group representing an object of the one or more objects of the first frame.

* * * * *